United States Patent
Wen et al.

(10) Patent No.: US 8,884,814 B2
(45) Date of Patent: Nov. 11, 2014

(54) PROCESSING METHOD FOR FMCW RADAR SIGNAL WITH DUAL PULSE REPETITION FREQUENCY

(71) Applicants: Yao-Hwa Wen, New Taipei (TW); Min-Fang Lo, Zhongli (TW)

(72) Inventors: Yao-Hwa Wen, New Taipei (TW); Min-Fang Lo, Zhongli (TW)

(73) Assignee: Chung Shan Institute of Science and Technology, Armaments Bureau, M. N.D., Taoyuan County (TW)

( * ) Notice: Subject to any disclaimer, the term of this patent is extended or adjusted under 35 U.S.C. 154(b) by 217 days.

(21) Appl. No.: 13/707,528

(22) Filed: Dec. 6, 2012

(65) Prior Publication Data

US 2014/0159947 A1    Jun. 12, 2014

(51) Int. Cl.
*G01S 13/24* (2006.01)
*G01S 13/30* (2006.01)
*G01S 7/288* (2006.01)

(52) U.S. Cl.
CPC ............... *G01S 13/24* (2013.01); *G01S 13/30* (2013.01); *G01S 2007/2883* (2013.01)
USPC ............ 342/196; 342/104; 342/115; 342/137

(58) Field of Classification Search
CPC .. G01S 13/24; G01S 13/30; G01S 2007/2883
USPC .................... 342/196, 104, 112, 115, 137
See application file for complete search history.

(56) References Cited

U.S. PATENT DOCUMENTS

| | | | |
|---|---|---|---|
| 7,876,262 B2 * | 1/2011 | Greendale et al. | 342/101 |
| 8,169,362 B2 * | 5/2012 | Cook et al. | 342/162 |
| 8,493,265 B2 * | 7/2013 | Cornic et al. | 342/196 |
| 2008/0129582 A1 * | 6/2008 | Hsieh et al. | 342/94 |
| 2011/0025546 A1 * | 2/2011 | Cook et al. | 342/22 |
| 2011/0122013 A1 * | 5/2011 | Takeya et al. | 342/109 |
| 2014/0159947 A1 * | 6/2014 | Wen et al. | 342/196 |

FOREIGN PATENT DOCUMENTS

KR    101348512 B1 *    1/2014

OTHER PUBLICATIONS

Sediono, W., "Method of measuring Doppler shift of moving targets using FMCW maritime radar," Teaching, Assessment and Learning for Engineering (TALE), 2013 IEEE International Conference on , vol., No., pp. 378,381, Aug. 26-29, 2013.*
Williams, C.R., "Developing a dual-frequency FM-CW radar to study precipitation," Geoscience and Remote Sensing Symposium (IGARSS), 2011 IEEE International , vol., No., pp. 3995,3997, Jul. 24-29, 2011.*

* cited by examiner

*Primary Examiner* — John B Sotomayor
(74) *Attorney, Agent, or Firm* — Chun-Ming Shih

(57) ABSTRACT

A processing method for radar signal with dual pulse repetition frequency, comprising: generating a first transmission signal and a second transmission signal, and perform a transmission process; reflecting a first echo signal and a second echo signal from an object, and converting the first transmission signal and the second transmission signal to a frequency domain information by using 2D (Two Dimension) fast Fourier transform (FFT); and filtering noise in the frequency domain information, and performing a calculation program by using a algorithm to obtain Doppler shift of the object. Thereby, the processing method of the present invention can overcome the bad operation ability of the lower hardware and advance the radar target detection speed restrictions.

10 Claims, 2 Drawing Sheets

PROCESSING METHOD FOR FMCW RADAR SIGNAL WITH DUAL PULSE REPETITION FREQUENCY

BACKGROUND OF THE INVENTION

1. Field of the Invention

The present invention relates to a processing method for radar signal with dual pulse repetition frequency, and more particularly, to a method applying in driving radar sensor for obtaining Doppler shift by emitting different signals with different pulse repetition frequencies to performing detections and obtaining relationships between the different repetition frequencies and associated echo signals

2. Description of the Related Art

A radar speedometer uses the Doppler Effect generated when transmitting electromagnetic wave to perform the velocity measurement. When distance between the object measured and the radar gets shorten, the echo frequencies received by the radar increased; otherwise, when the object moves away from the radar, the echo frequencies received by the radar decrease. Thereby, information of the object measured is obtained according to the frequency variation, for example, distance, relatively velocity, etc.

The FMCW (frequency-modulated continuous wave) radar is one of widely used radars, the advantages of the FMCW radar includes: the measurement result can be more accurate, the echo wave received and transmission signal not overlap each other in the time domain so as to perform the receiving and transmission operation via a single antenna to simplify size of the structure.

However, signals of the FMCW radar can be processed by using 2D (Two Dimension) fast Fourier transform (FFT) so the object measured and the ground clutter can be effectively separated and also perform coherent integration process to increase the radar coverage. The repetition frequency (PRF) of the FMCW radar generally is 1 KHz because of TR-PLL and DSP-MCU. From the Doppler shift, the associated unambiguous velocity of $f_d$ is 6.2 m/s (22.3 km/h) which does not confirm to the detection of the general vehicle speed when the radar transmission signal wavelength is 0.0124 m. If want to increase the detection limit to achieve the unambiguous velocity over 27.778 m/s (100 km/h), the associated Doppler shift is $f_d$=4.46 KHz, and the repetition frequency of radar pulse must be 4.46 KHz or more for avoiding the inaccurate detection result. Therefore, it is difficult to increase the detection limit based on the TR-PLL and DSP-MSU.

For the reason that the conventional method and device could not effectively solve the problem of increasing the detection limit, a need has arisen to propose a novel processing method for radar signal with dual pulse repetition frequency in order to overcome the aforementioned problems.

SUMMARY OF THE INVENTION

In view of the foregoing, it is an object of the present invention to provide a processing method for radar signal with dual pulse repetition frequency, which adopts radar transmission signal with low repetition frequency and an algorithm to detect the Doppler shift being higher than the transmission pulse repetition frequency so as to increase the detection limit of the Doppler shift, that means, to advance the unambiguous velocity of an object measured.

For achieving the object above, a processing method for radar signal with dual pulse repetition frequency is disclosed according to one embodiment of the present invention. The processing method comprises: generating a first transmission signal and a second transmission signal, and perform a transmission process; reflecting a first echo signal and a second echo signal from an object, and converting the first transmission signal and the second transmission signal to a frequency domain information by using 2D (Two Dimension) fast Fourier transform (FFT); and filtering noise in the frequency domain information, and performing a calculation program by using a algorithm to obtain Doppler shift of the object.

Specifically, the frequency domain information comprises pulse repetition frequencies of the first transmission signal, the second transmission signal, the first echo signal and the second echo signal, and the Doppler shift by result of the object movement is obtained according to relationships between the pulse repletion frequencies. The processing method of the present invention can use the transmission signal with low repetition frequency to detect the higher Doppler shift in the lower hardware so as to overcome the bad operation ability of the lower hardware and advance the radar target detection speed restrictions.

BRIEF DESCRIPTION OF THE DRAWINGS

The invention, as well as its many advantages, may be further understood by the following detailed description and drawings in which.

DETAILED DESCRIPTION OF THE INVENTION

Reference will now be made to the drawings to describe exemplary embodiments of the present driving control system and method for visual evoked brain wave by multi-frequency phase encoder, in detail. The following description is given by way of example, and not limitation.

Figure 1:
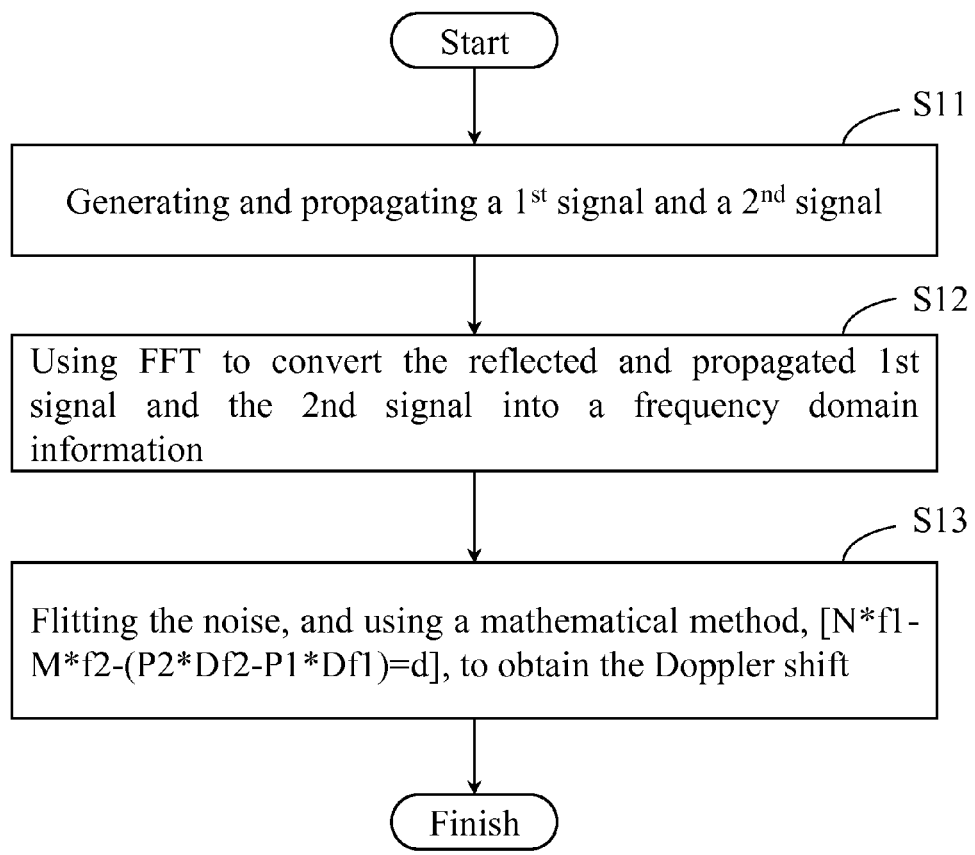
FIG. 1 is step flow chart illustrating a processing method for radar signal with dual pulse repetition frequency.

Referring to FIG. 1, which illustrates a processing method for radar signal with dual pulse repetition frequency. The processing method can increase the number of echo signals by Doppler Effect when an object moves toward to radar in high speed, and steps of the processing method as follow.

Step S11: generating a first transmission signal and a second transmission signal by a signal generation module (not shown in), and transmitting the first and second transmission signals by a transmission module (not shown in). Then, proceeding to Step S12.

Step S12: reflecting a first echo signal and a second echo signal from an object after the first and second signals emit to the object, and receiving the first and second echo signals by a receiving module (not shown in), and converting the first and second transmission signals and the first and second echo signals to a frequency domain information based on 2D (Two Dimension) fast Fourier transform (FFT) by processing module (not shown in). Then, proceeding to Step S13.

Step S13: filtering noise in the frequency domain information by a noise filtering unit (not shown in) in the processing module to obtain a detection information of the object, and calculating the detection information based on an algorithm In a preferred embodiment, the first transmission signal is a first transmission pulse signal, and the symbol "$f_1$" represents the first transmission pulse signal with the pulse repetition frequency (PRF).

In a preferred embodiment, the second transmission signal is a second transmission pulse signal, and the symbol "$f_2$" represents the second transmission pulse signal with the PRF.

In a preferred embodiment, the first echo signal is a first echo pulse signal, and the symbol "$f_1'$" represents the first echo pulse signal with the PRF, and $f_1'>f_1$.

In a preferred embodiment, the second echo signal is a second echo pulse signal, and the symbol "$f_2'$" represents the second echo pulse signal with the PRF, and $f_2'>f_2$.

In a preferred embodiment, the Doppler shift $f_d=f_1'-f_1=f_2'-f_2=(V/c)f_1=(V/c)f_2$, and wherein V is the relative velocity between the radar and the object, c is the electromagnetic transmission velocity of the first and second transmission signal.

In a preferred embodiment, the frequency information includes the first transmission pulse signal $f_1$, the second transmission pulse signal $f_2$, the first echo pulse signal $f_1'$ and the second echo pulse signal $f_2'$.

Figure 2:
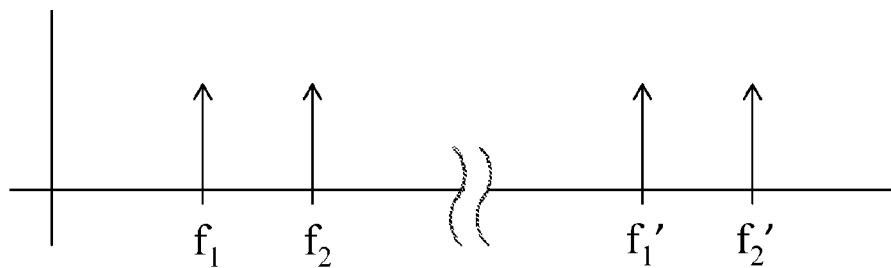
FIG. 2 is a schematic diagram illustrating the transmission signal and the echo signal in the frequency domain.

Referring to FIG. 2, which illustrates a spectrum distribution schematic diagram when $f_1'>f_1$ and $f_2'>f_2$, and the purpose of the preferred embodiment is to get the solution of $f_d$.

In Step S13, the algorithm is operated by using the frequency information, and the operation equation of the algorithm is an inequality, and the operation equation of the algorithm is illustrated as follow:

$$N*f_1-M*f_2-(P_2*\Delta f_2-P_1*\Delta f_1)\to \delta,$$

Wherein N and M are positive integers, $P_1$ and $P_2$ respectively represent locations of the repetition frequency $f_1'$ of the first echo pulse signal and repetition frequency $f_2'$ of the second echo pulse signal in the sampling point of 2D (Two Dimension) FFT, $\Delta f_1$ and $\Delta f_2$ represent the frequency domain sampling intervals of 2D (Two Dimension) FFT (means that $f_1$ is a multiple of $\Delta f_1$, $f_2$ is a multiple of $\Delta f_2$) and 0. The algorithm represent the relationship between the multiple and difference, for example, the relationship is illustrated as follow:

$$f_d=f_1'-f_1=f_2'-f_2=N*f_1+(P_1*\Delta f_1)=M*f_2+(P_2*\Delta f_2),$$

Figure 3A:
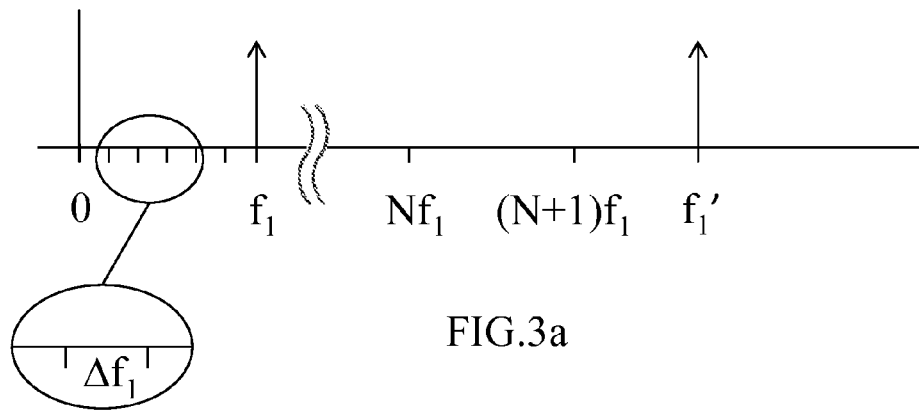
FIG. 3a is a relationship diagram illustrating the first transmission pulse signal and the first echo pulse signal in the frequency domain.
Figure 3B:
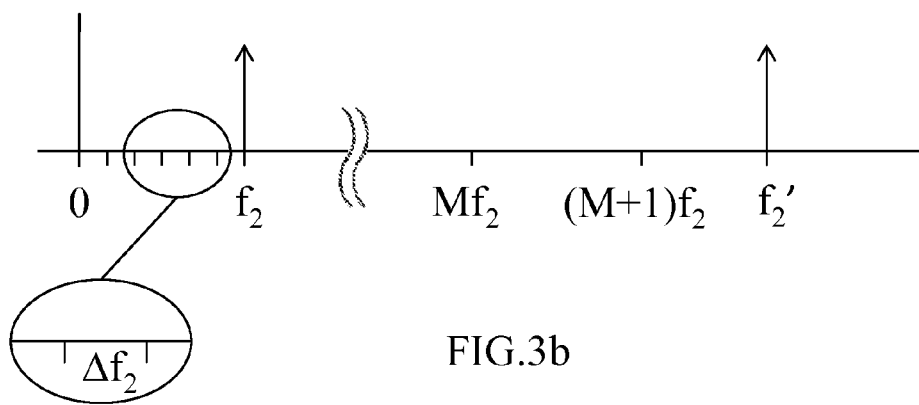
FIG. 3b is a relationship diagram illustrating the second transmission pulse signal and the second echo pulse signal in the frequency domain.

In other words, when $f_d>f_1+f_2$, $f_d=$a multiple of $(f_1+f_2)+$a specific value, as shown in FIGS. 3a and 3b. Specifically, $f_1'-(N+1)f_1$ is equal to a multiple of $\Delta f_1$ and $f_2'-(M+1)f_2$ is equal to a multiple of $\Delta f_2$.

In the embodiment, supposing that the repetition frequency $f_1$ of the first transmission pulse signal is 901 Hz, the repetition frequency $f_2$ of the second transmission pulse signal is 503 Hz, and sample intervals adopted by 2D (Two Dimension) FFT respectively are $\Delta f_1=901/16$ Hz, $\Delta f_1=503/16$ Hz. $P_1$ and $P_2$ respectively represent sample point in $f_1$ and $f_2$(means that the points of associated locations of $f_1'$ and $f_2'$, for example, first point, second point, and so on). Thereby, $(P_1*f_1/\Delta f_1)$ and $(P_2*f_2/\Delta f_2)$ are the known values, and calculated by the processing module (not shown in) so as to allow M and N to meet the minimum integers, and $\delta$ has a minimum value approaching to 0 to obtain the $f_d=4.46$ KHz.

In accordance with the preferred embodiments mentioned, the present invention is capable of detecting the Doppler shift with larger variation by using the radar transmission frequency with lower repetition frequency and limit conditions of adopting the TR-PLL loop and lower DSP-MCU, so as to increase the speed detection ability of object movement. However, the processing method disclosed by the present invention is not limited by the dual pulses (means that at least two transmission pulse signals), and the processing method also may apply in more two transmission pulse signals, and the operation manner is equal to at least two transmission pulse signals, and it will not discussed herein.

Therefore, the processing method for radar signal with dual pulse repetition frequency of the present invention use 2D (Two Dimension) FFT program to convert the first and second transmission signals, the first and second echo signals to obtain the frequency information, and then perform to filter the noise in the frequency information. Subsequently, the relationships between the repetition frequencies ($f_1$, $f_2$, $f_1'$ and $f_2'$) and Doppler shift ($f_d$) is calculated by the algorithm to obtain the associated Doppler shift ($f_d$) so as to overcome the bad operation ability of the lower hardware and advance the radar target detection speed restrictions. Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A processing method for radar signal with dual pulse repetition frequency, comprising:
   generating a first transmission signal and a second transmission signal, and perform a transmission process;
   reflecting a first echo signal and a second echo signal from an object, and converting the first transmission signal and the second transmission signal to a frequency domain information by using 2D (Two Dimension) fast Fourier transform (FFT); and
   filtering noise in the frequency domain information, and performing a calculation program by using a algorithm to obtain Doppler shift of the object.

2. The processing method of claim 1, wherein the algorithm is an inequality, representing as follow:

$$N*f_1-M*f_2-(P_2*\Delta f_2-P_1*\Delta f_1)\to \delta.$$

3. The processing method of claim 2, wherein $f_1$ in the inequality is the pulse repetition frequency of the first transmission signal.

4. The processing method of claim 2, wherein $f_2$ in the inequality is the pulse repetition frequency of the second transmission signal.

5. The processing method of claim 2, wherein $P_1$ in the inequality is a point of the repetition frequency of the first echo signal located in sampling points of 2D FFT.

6. The processing method of claim 2, wherein $P_2$ in the inequality is a point of the repetition frequency of the second echo signal located in sampling points of 2D FFT.

7. The processing method of claim 2, wherein N and M in the inequality are integers.

8. The processing method of claim 2, wherein $\Delta f_1$ and $\Delta f_2$ in the inequality respectively represent sample intervals of the first and second transmission signals in 2D FFT.

9. The processing method of claim 2, wherein $\delta$ in the inequality is 0.

10. The processing method of claim 2, wherein the Doppler shift ($f_d$) is obtained according to N, M and relationships between $f_d$ and $f_1$, $f_2$, $\Delta f_1$, $\Delta f_2$, $P_1$, $P_2$, and a calculation equation is illustrated as follow:

$$f_d=f_1'-f_1=f_2'-f_2=N*f_1+(P_1*\Delta f_1)=M*f_2+(P_2*\Delta f_2).$$

* * * * *